United States Patent
Frignac et al.

(10) Patent No.: US 7,177,545 B2
(45) Date of Patent: Feb. 13, 2007

(54) OPTICAL FILTER AND TRANSMISSION SYSTEM INCORPORATING AN OPTICAL FILTER

(75) Inventors: Yann Frignac, Paris (FR); Sébastien Bigo, Massy (FR)

(73) Assignee: Alcatel, Paris (FR)

( * ) Notice: Subject to any disclaimer, the term of this patent is extended or adjusted under 35 U.S.C. 154(b) by 665 days.

(21) Appl. No.: 10/320,510

(22) Filed: Dec. 17, 2002

(65) Prior Publication Data
US 2003/0133716 A1    Jul. 17, 2003

(30) Foreign Application Priority Data
Jan. 11, 2002    (EP) .................. 02360016

(51) Int. Cl.
*H04J 14/02*    (2006.01)
(52) U.S. Cl. ........................... 398/85; 398/149
(58) Field of Classification Search ................. 398/85, 398/193–196, 199, 149
See application file for complete search history.

(56) References Cited

U.S. PATENT DOCUMENTS

| | | | |
|---|---|---|---|
| 6,748,134 B2* | 6/2004 | Bigo et al. ............... | 385/24 |
| 6,766,116 B2* | 7/2004 | Webb ....................... | 398/196 |
| 2002/0075546 A1* | 6/2002 | Webb ....................... | 359/180 |
| 2002/0076132 A1* | 6/2002 | Peral et al. .............. | 385/15 |
| 2003/0123884 A1* | 7/2003 | Willner et al. ........... | 398/212 |

FOREIGN PATENT DOCUMENTS

| EP | 1 130 835 A1 | 9/2001 |
|---|---|---|
| WO | WO 96/37042 A1 | 11/1996 |

OTHER PUBLICATIONS

Bigo S et al: "Multi-Terabit/s Transmission over Alcatel Teralighttm Fiber" Electrical Communication Alcatel. Brussels, BE, No. 4, Oct. 1, 2000, pp. 288-296, XP000976732.

Navarro J A et al: "Direct-modulation/direct-detection technology in multigigabit optical networks" Electrotechnical Conference, 1994, Proceedings., 7th Mediterranean Antalya, Turkey Apr. 12-14, 1994, New York, NY, USA, IEEE Apr. 12, 1994, pp. 175-178, XP010130833.

* cited by examiner

*Primary Examiner*—Dzung Tran
(74) *Attorney, Agent, or Firm*—Sughrue Mion, PLLC

(57) ABSTRACT

The present invention propose an optical filter for filtering out at least a part of one of two spectral side-bands of a coded optical signal spectrum having a carrier wavelength, the first of said side-bands which is to be transmitted by said filter being called transmitted side-band, the second of said side-bands which is to be filtered out by said filter being called vestigial side-band, said optical filter having a transmission response in intensity, having a maximum value at a central filter wavelength distinct from said carrier wavelength and located in said transmitted side-band, and said response being divided into two parts, a first filter part associated to a wavelength region including said carrier wavelength, a second filter part associated to a wavelength region which does not include said carrier wavelength where at a given value of transmittance distinct from said maximum value, said second filter part has a filter width smaller than the filter width of said first filter part.

11 Claims, 2 Drawing Sheets

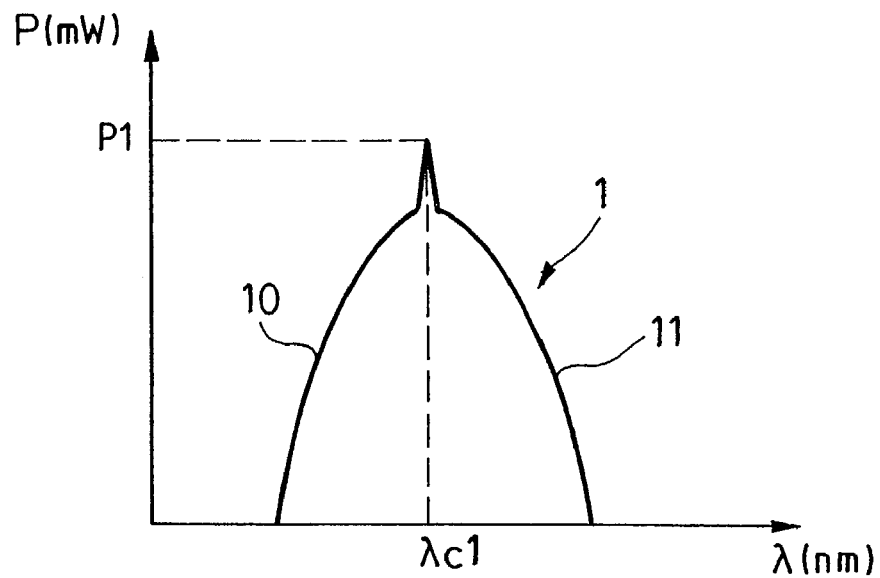
FIG_1
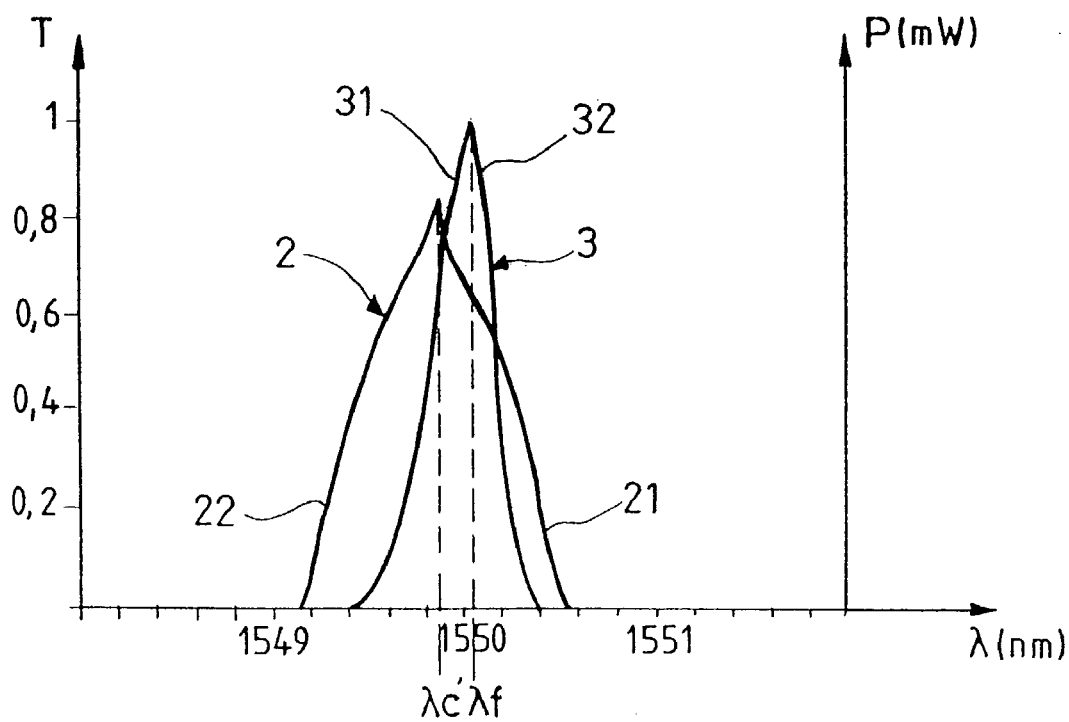
FIG_2

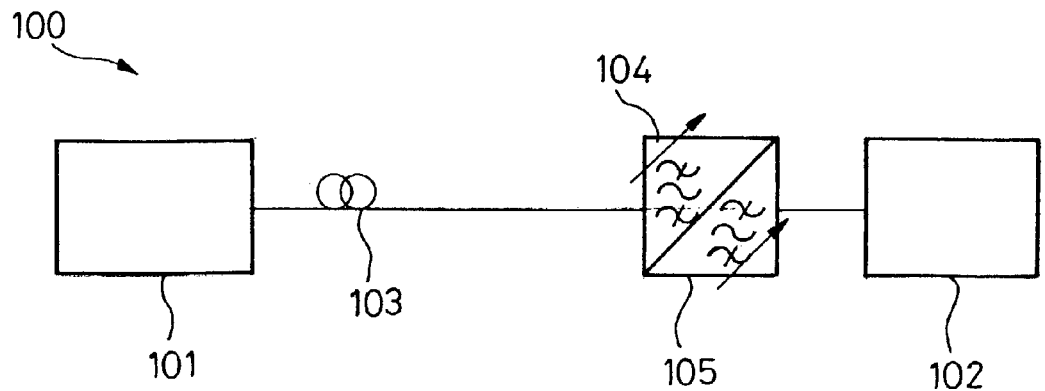
FIG_3
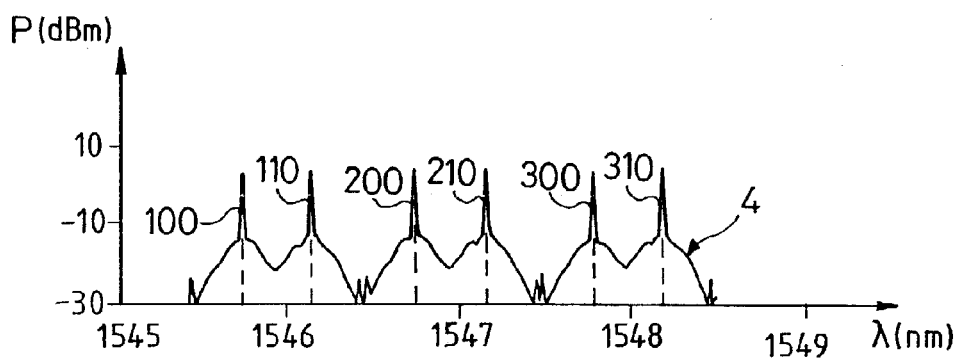
FIG_4
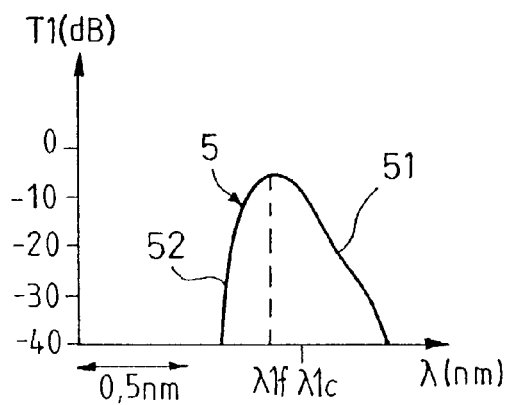
FIG_5a
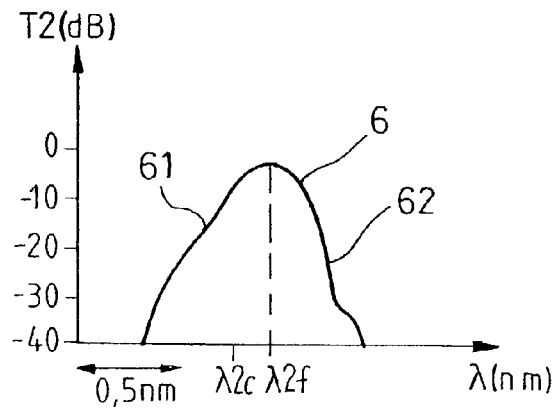
FIG_5b

OPTICAL FILTER AND TRANSMISSION SYSTEM INCORPORATING AN OPTICAL FILTER

BACKGROUND OF THE INVENTION

The invention is based on a priority application EP 02 360 016.6 which is hereby incorporated by reference.

The present invention relates to the field of optical filters.

As is known, a coded optical signal namely a signal carrying information such as an RZ or NRZ coded signal ((Non) Return to Zero) has intensity modulations. FIG. 1 shows the curve 1 representing the classical spectrum 1 of an NRZ coded signal. This spectrum is shown in terms of optical power P as a function of wavelength λ. This spectrum presents a profile with a carrier wavelength λc1 at a maximum optical power P1 and has two side-bands 10, 11 with respect to this carrier wavelength λc1.

The two side-bands 10, 11 of this NRZ spectrum contain redundant information. It is therefore attractive to filter out one of them in order to improve transmission performance. This technique, known as Vestigial Side-band (VSB) filtering, is used in DWDM (Dense Wavelength Division Multiplexing) transmission systems transmitting NRZ coded signals. It involves a narrow optical filter, narrower than the signal bandwidth, and which is offset with respect to the carrier wavelength.

SUMMARY OF THE INVENTION

An object of the invention is to implement an optical filter which is filtering out a part of a coded optical signal spectrum having redundant information in such a way that transmission performance are optimised.

For this purpose, the present invention proposes an optical filter for filtering out at least a part of one of two spectral side-bands of a coded optical signal spectrum having a carrier wavelength, the first of said side-bands which is to be transmitted by said filter being called transmitted side-band, the second of said side-bands which is to be filtered out by said filter being called vestigial side-band, said optical filter having a transmission response in intensity having a maximum value at a central filter wavelength distinct from said carrier wavelength and located in said transmitted side-band, and said response being divided into two parts, a first part associated to a wavelength region including said carrier wavelength, a second filter part associated to a wavelength region which does not include said carrier wavelength, where at a given value of transmittance distinct from said maximum value, said second filter part has a filter width which is smaller than the filter width of said first filter part.

Each filter width is defined as the difference between the carrier wavelength and the wavelength corresponding to the given value of transmittance.

Such an asymmetric filter enhances transmission performance. The asymmetry can be total, that is for each value of transmittance the filter width of the second filter part is smaller than the filter width of the first filter part, or can be partial.

In addition, the carrier wavelength can be partially suppressed.

The transmitted side-band can be as well the highest wavelength side-band or the lowest wavelength side-band of the optical signal spectrum.

Preferably, the filter width of the second filter part can be substantially equal to 0.43 of the filter width of the first filter part.

Advantageously, the shift between the carrier wavelength and the central filter wavelength can be substantially proportional to said filter width of the first filter part.

In a preferred embodiment of the invention, the response has a Full Width Half Maximum (FWHM), that is the difference between the wavelengths corresponding to half the maximum value of transmittance, which is lower than the optical signal spectrum FWHM that is the difference between the wavelengths corresponding to half the maximum value of power.

The present invention also deals with a transmission system in which at least two coded optical signals are multiplexed and transmitted between an emitter and a receiver, a first of said coded signals providing a first spectrum having a first carrier wavelength and two side-bands, a second of said coded signals providing a second spectrum having a second carrier wavelength higher than said first carrier wavelength and two side-bands. This transmission system comprises at least two optical filters according to the invention, a first of the filters filtering out one of the first spectrum side-bands, a second of said filters filtering out one of the second spectrum side-bands.

Asymmetry filters of the invention allow a very reduced cross-talk between adjacent coded signals.

The asymmetry of optical filters of the invention can depend on the side-bands to filter out a well as the spectral shape of the modulation format and the wavelength allocation scheme used.

Preferably, when the first and second spectra partially overlap each other, as it is the case for example in some DWDM systems with non constant interchannel spacing, the lowest wavelength side-band of the first spectrum and the highest wavelength side-band of the second spectrum can be transmitted side-bands.

VSB can be difficult to implement at a transmitter because the vestigial side-band rapidly reconstructs for example, through fiber non linearities.

Thus, preferably, the optical filters can be located close to the receiver.

In one embodiment of the invention, the first and/or the second optical filters of the invention have a tuneable central filter wavelength.

Moreover, in this embodiment, the first or second optical filter can have filter widths of the first and second filter parts which are tuneable, thus the first optical filter and the second optical filter of the invention can be a single optical filter.

BRIEF DESCRIPTION OF THE DRAWINGS

Other characteristics and advantages of the invention will appear on reading the following description of embodiments of the invention, given by way of example and with reference to the accompanying drawings, in which:

FIG. 1, already described, shows the classical spectrum of an NRZ coded signal;

FIG. 2 shows the spectrum of a coded optical signal and the transmission response in intensity of an optical filter in a first embodiment of the invention;

FIG. 3 shows a transmission system in one embodiment of the invention;

FIG. 4 shows the spectra of DWDM multiplexed signals transmitted by the transmission system of FIG. 3;

FIGS. 5a and 5b show the transmission response in intensity of the two optical filters of the transmission system of FIG. 3.

FIG. 2 shows a curve 2 representing the spectrum of a coded optical signal and a curve 3 representing the transmission response in intensity of an optical filter in a first embodiment of the invention.

This optical signal spectrum is shown in terms of optical power P as a function of wavelength λ. The spectrum has a carrier wavelength λc' around 1550 nm, two spectral side-bands 21, 22 and a given Full Width Half Maximum (FWHM). The side-band 21, which is the higher wavelength side-band and is to be transmitted, is called transmitted side-band. The side-band 22, which is to be filtered out, is called vestigial side-band.

The transmission response is shown in terms of normalized transmittance T (linear scale) as a function of wavelength λ. The transmission response, for example with a total asymmetric gaussian shape, has a maximum value equal to 1 at a central filter wavelength λf distinct from the carrier wavelength λc' and located in the transmitted side-band 21, and also is divided into two parts 31, 32 and a filter FWHM lower than the optical signal spectrum FWHM. The first filter part 31, associated to a wavelength region including the carrier wavelength λc', has a filter width of e.g. 0.175 nm at the filter FWHM. The second filter part 32 associated to a wavelength region which does not include said carrier wavelength has a filter width at the filter FWHM which is smaller than the one of the first filter part 31 e.g. substantially equal to 0.43 of the one of the first filter part 31 (0.075 nm).

The shift between the carrier wavelength λc' and the central filter wavelength λf is substantially proportional to the filter width of the first filter part 31 at the filter FWHM and by way of example, is substantially equal to 0.14 nm.

The transmission performance of such a filter used in a transmission system, is given by Q' defined by the following formula:

$$Q' = \frac{\sqrt{P_1} - \sqrt{P_0}}{\sqrt{2<P>}}$$

in which:
$P_0$ is the mean input signal power corresponding to a standard deviation of a bit "0",
$P_1$ is the mean input signal power corresponding to a standard deviation of a bit "1",
and P is the time average power.

With the optical filter of the invention described above, Q' is around 0.43 instead of 0.39 for an optical filter of the prior art (not shown) having a symmetric gaussian profile.

FIG. 3 shows a transmission system 100 in one embodiment of the invention transmitting DWDM coded signals (not shown) between a transmitter 101 and a receiver 102 via a link 103 including an optical fiber.

Two optical filters of the invention 104, 105 are located close to the receiver 102. The filters 104, 105 have a tuneable central filter wavelength.

Such a DWDM transmission system 100 has very close coded signals and uses an allocation scheme with non equidistant spacing (75 GHz and 50 GHz in alternance) in order to increase the spectral efficiency.

In a variant of this embodiment, the filter 104 have a tuneable filter central wavelength and also tuneable filter widths at given value(s) of transmittance. In this configuration, the optical filters 104, 105 can be a single filter.

FIG. 4 shows a curve 4 representing the spectra of DWDM coded signals transmitted by the transmission system 100.

These spectra are shown in terms of optical power P (logarithmic scale) as a function of wavelength λ. Each spectrum 100, 110, 200, 210, 300, 310 presents a distinct carrier wavelength respectively substantially equal to 1545.72 nm, 1546.12 nm, 1546.72 nm, 1547.12 nm, 1547.72 nm, 1548.12 nm and two spectral side-bands.

For each group of spectra overlapping each other, the spectrum 100, 200, 300 located in the lowest wavelength side has the lowest wavelength side-band which is to be is transmitted and the spectrum 110, 210, 310 located in the highest wavelength side has the highest wavelength side-band which is to be is transmitted.

FIGS. 5a and 5b show the curves 5, 6 representing the transmission response in intensity of the two optical filters of the transmission system 100. The following description is made in combination with FIG. 4.

The transmission responses are shown in terms of transmittance T1, T2 (logarithmic scale) as a function of wavelength λ.

Filters 104, 105 filtering two coded signals spectra 200, 210 as shown in FIG. 4.

The filter 104 is filtering out the highest wavelength side-band of the spectrum 200. The transmittance T1 has a maximum value around −5 dB at a tuneable central filter wavelength λ1f distinct from the carrier wavelength λ1c and located in the transmitted side-band of the spectrum 200, and also is divided into two parts 51, 52 and a filter FWHM lower than the associated optical signal spectrum FWHM.

The first filter part 51 is associated to a wavelength region including the carrier wavelength λ1c. At the filter FWHM, the second filter part 52 has a filter width which is smaller than the one of the first filter part 51.

The filter 105 is filtering out the lowest wavelength side-band of the spectrum 210. The transmittance T2 has a maximum value around −2 dB at a tuneable central filter wavelength λ2f distinct from the carrier wavelength λ2c and located in the transmitted side-band of the spectrum 210, and also is divided into two parts 61, 62 and a filter FWHM lower than the associated optical signal spectrum FWHM.

The first filter part 61 is associated to a wavelength region including the carrier wavelength λ2c. At the filter FWHM, the second filter part 62 has a filter width which is smaller than the one of the first filter part 61.

Of course, the present invention is not limited to the examples and embodiments described and shown, and the invention can be the subject to numerous variations that are available to the person skilled in the art.

The shape of the filter response can be an asymmetric gaussian shape as well as any kind of asymmetric shape such as an asymmetric Bessel shape, a butterworth shape, an asymmetric flat top shape, an asymmetric apodized shape.

The invention claimed is:

1. An optical filter system which filters out at least a part of one of two spectral side-bands of a coded optical signal spectrum having a carrier wavelength, the system comprising:
   a first filter which transmits a first one of said side-bands which is a transmitted side-band; and
   a second filter which filters out a second one of said side-bands which is a vestigial side-band,
   wherein the first and second filters generate a transmission response in intensity having a maximum value at a central filter wavelength distinct from said carrier wavelength and located in said transmitted side-band, wherein the transmission response further comprises:
   a first filter part associated with a wavelength region including said carrier wavelength; and a second filter part associated with a wavelength region which does not include said carrier wavelength, wherein at a given value of transmission response distinct from said maximum value, said second filter part has a filter width smaller than the filter width of said first filter part.

2. The optical filter system in accordance with claim 1 wherein said transmitted side-band is the highest wavelength side-band of said optical signal spectrum.

3. The optical filter system in accordance with claim 1 wherein said transmitted side-band is the lowest wavelength side-band of said optical signal spectrum.

4. The optical filter system in accordance with claim 1 wherein said filter width of said second filter part is equal to 0.43 of said filter width of said first filter part.

5. The optical filter system in accordance with claim 1 wherein a shift between said carrier wavelength and said central filter wavelength is proportional to said filter width of said first filter part.

6. The optical filter system in accordance with claim 1 wherein said transmission response has a Full Width Half Maximum (FWHM) lower than the optical signal spectrum FWHM.

7. A transmission system in which at least two coded optical signals are multiplexed and transmitted, the system comprising:
   an emitter from which a first one of said coded signals comprising a first spectrum having a first carrier wavelength and two side-bands, and a second one of said coded signals comprising a second spectrum having a second carrier wavelength higher than said first carrier wavelength and two side-bands are transmitted;
   at least two optical filters outputting filtered optical signals, wherein a first one of said filters filters out one of said first spectrum side-bands, and a second one of said filters filters out one of said second spectrum side-bands;
   a receiver which receives the output filtered signals from the at least two optical filters;
   wherein each of the at least two optical filters comprises:
      a first filter which transmits a first one of said side-bands which is a transmitted side-band; and
      a second filter which filters out a second one of said side-bands which is a vestigial side-band,
      wherein the first and second filters generate a transmission response in intensity having a maximum value at a central filter wavelength which is distinct from a carrier wavelength of a corresponding coded optical signal and located in said transmitted side-band,
      wherein the transmission response comprises:
         a first filter part associated with a wavelength region including the carrier wavelength of the corresponding coded optical signal; and
         a second filter part associated with a wavelength region which does not include the carrier wavelength of the corresponding coded optical signal,
         wherein at a given value of transmission response distinct from said maximum value, said second filter part has a filter width smaller than the filter width of said first filter part.

8. The transmission system in accordance with claim 7, wherein said first and second spectra partially overlap each other, and wherein a lowest wavelength side-band of said first spectrum and a highest wavelength side-band of said second spectrum are transmitted side-bands.

9. The transmission system in accordance with claim 7, wherein said optical filters are located close to said receiver.

10. The transmission system in accordance with claim 7, wherein said first or said second optical filter has a tunable central filter wavelength.

11. The transmission system in accordance with claim 10, wherein said first or said second optical filter has filter widths which are tunable, and said first optical filter and said second optical filter are implemented in a single optical filter.

* * * * *